United States Patent [19]

Lopez

[11] 4,121,369

[45] Oct. 24, 1978

[54] HOLLOW FISHING ROD WITH ELASTIC LINE

[76] Inventor: David L. Lopez, 14324 Spring Oaks Dr., Balch Springs, Tex. 75180

[21] Appl. No.: 761,677

[22] Filed: Jan. 24, 1977

[51] Int. Cl.² .............................................. A01K 87/00
[52] U.S. Cl. ...................................... 43/18 R; 43/23; 43/24; 43/42.72
[58] Field of Search ............... 43/42.72, 18 R, 18 GF, 43/19.2, 23, 24

[56] References Cited

U.S. PATENT DOCUMENTS

| 1,613,522 | 1/1927 | Mathey | 43/18 R |
| 1,618,302 | 2/1927 | Mathey | 43/18 R |
| 2,334,646 | 11/1943 | Price | 43/18 R |
| 2,620,586 | 12/1952 | Seifert | 43/24 |

FOREIGN PATENT DOCUMENTS 660,697 2/1929 France .................... 43/18 R

Primary Examiner—Clifford D. Crowder

Attorney, Agent, or Firm—Peter J. Murphy

[57] ABSTRACT

A fishing rod assembly includes an elongated hollow fiberglass rod having an end plug secured to its butt or handle end, the end plug having an eyelet extending into the rod to which fishing line is attached. The fishing line includes a length of elastic line attached to the end plug and retained within the rod bore, and a length of nonelastic line coupled to the elastic line by means of a coupler and extending from the tip end of the hollow rod. The coupler coacts with a limit structure within the rod adjacent the tip end to prevent the elastic line from passing out of the tip end; and the limit structure may be a transverse pin or other internal protuberance such as a sleeve. A stop attached to the nonelastic fishing line coacts with the tip into the rod to limit withdrawal of the line into the rod and fix the limit of maximum contraction of the elastic line. An external finger projects from the rod tip end to coact with a locking loop in the line and fix the length of line which extends from the tip end.

6 Claims, 6 Drawing Figures

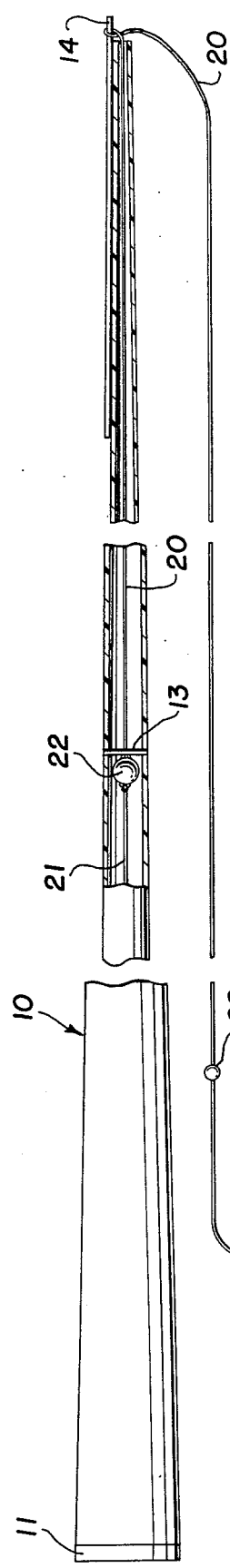
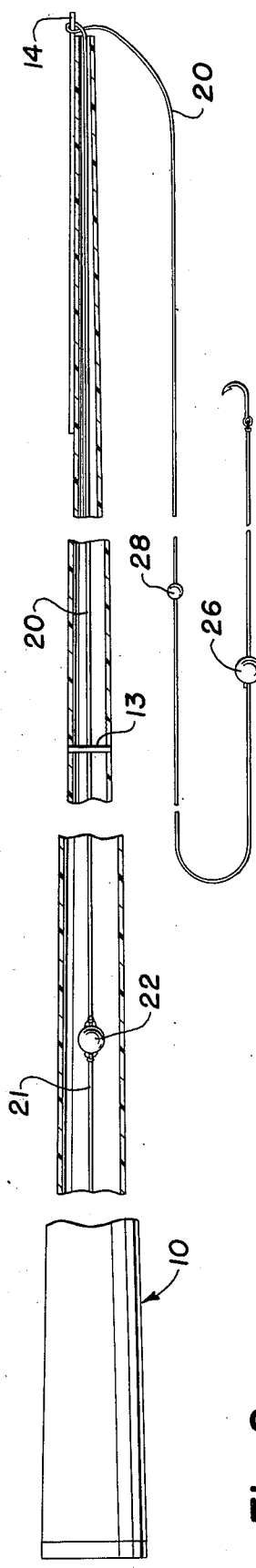
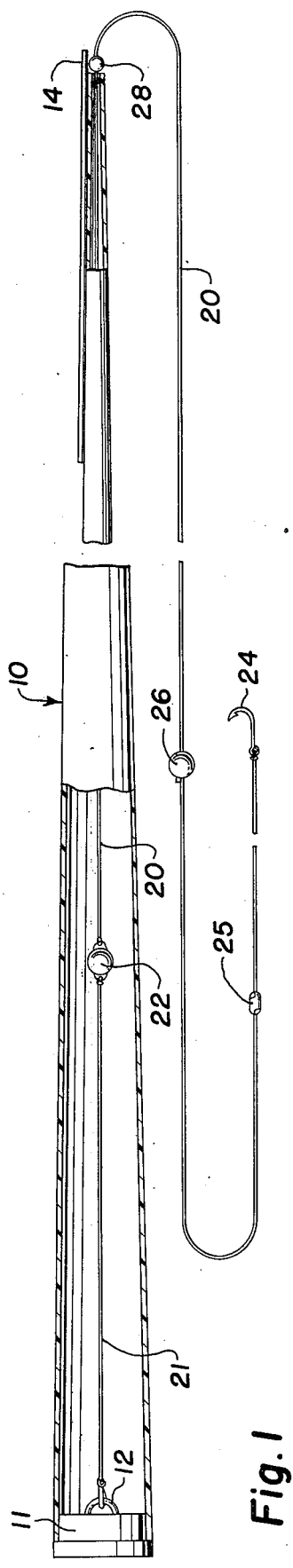
Fig. 3
Fig. 2
Fig. 1

HOLLOW FISHING ROD WITH ELASTIC LINE

BACKGROUND AND SUMMARY OF THE INVENTION

This invention relates to an inexpensive fishing rod or pole for use in still fishing, with an attached fishing line which is adjustable in length.

An object of this invention is to provide a very inexpensive fishing rod and line assembly particularly adapted for use by novice fishermen and children in still fishing for small fish such as crappie or perch.

Another object of this invention is to provide an inexpensive fishing rod, having attached fishing line and means by which the user may easily change the length of the fishing line extending from the tip of the rod.

A further object of this invention is to provide such a fishing rod and line assembly having means for exerting a strain upon the line when a fish is hooked.

Still another object of this invention is to provide such a fishing rod and line assembly which is very simple in design and therefore inexpensive to manufacture.

To accomplish these objects, a fishing rod comprises an elongated hollow rod having a butt end and a tip end. An end plug is removably secured to the rod at the butt end, and has line attachment means extending into the rod. A fishing line includes an elongated elastic line disposed within the rod having one end attached to the plug attachment means, and a nonelastic line extending into the rod through the tip end and attached to the other end of the elastic line. The rod and fishing line have coacting limit means to limit the maximum extension of said fishing line. The rod includes line retaining means fixed to its exterior at the tip end, for receiving a loop formed in the fishing line to limit the withdrawal of the line into the rod interior.

The novel features and the advantages of the invention, as well as additional objects thereof, will be understood more fully from the following description when read in connection with the accompanying drawings.

Drawings

FIG. 1 is a side view of a preferred form of fishing rod, partially in longitudinal section, illustrating the minimum line extension condition;

FIG. 2 is another side view of the rod, broken and partially in longitudinal section, illustrating an intermediate line extension condition;

FIG. 3 is still another side view of the rod of FIG. 1 broken partially in longitudinal section, illustrating the maximum extension of the line when so extended by a fish for example.

DESCRIPTION OF THE PREFERRED EMBODIMENT

Figure 6:
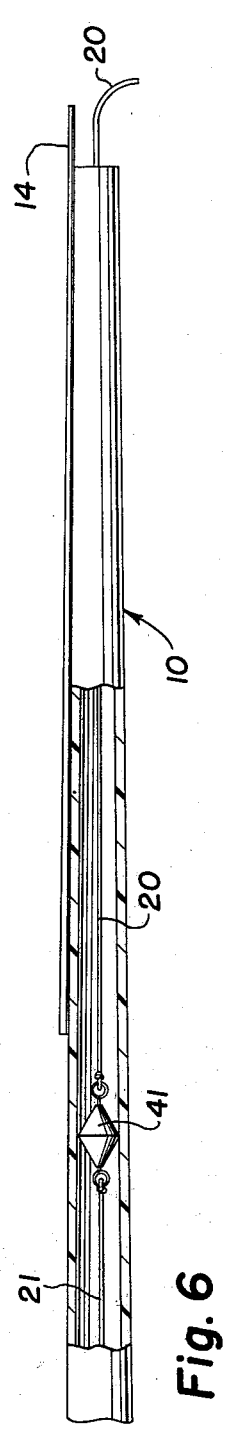
FIG. 6 is a fragmentary sectional view of the tip end of a rod, illustrating still another alternative structure for limiting the maximum line extension.

FIGS. 1, 2 and 3 of the drawing illustrate a preferred form of rod assembly accordng to the invention, and illustrate several conditions of use of this preferred rod assembly.

A rod 10 is illustrated as an elongated hollow tapered rod having a larger-diameter butt end and a smaller-diameter tip end. The rod may be fabricated of fiberglass for example; and, by way of example as to dimensions, the rod may have a length of 4 ½ feet, a butt end outer diameter of 9/16 inch, and a tip end outer diameter of 5/32 inch. However, the rod may be fabricated of any suitable material, may have different dimensions, and is not necessarily a tapered rod.

The fishing line secured to the rod includes a length of a standard nonelastic fishing line 20 which is attached to a length of an elastic line 21, the elastic line being retained within the hollow rod at all times as will be described. The standard fishing line 21 may have a length of about 9 feet for example, and the fishing rod assembly will enable varying the length of the line which extends from the tip end of the rod from between 5 feet and 8 ½ feet for example. At the free end of the standard line 20 there may be attached a conventional hook 24, sinker 25 and bobber 26.

An end plug 11 is removably secured to the rod at the butt end, being secured by friction for example or possibly having a threaded connection. This plug includes an eye 12 which extends into the rod interior and to which is attached the inner end of the elastic line 21. The plug is removable to enable repair of the fishing line when necessary. The standard fishing line 20 is attached to the elastic line 21 by means of an enlarged coupler 22, which coacts with stop structure of the rod 10 to define the maximum stretch of the elastic line and therefore, the maximum extension of the fishing line from the tip end of the rod. In the preferred embodiment of FIGS. 1 to 3, the coupler 22 is in the form of a ball or sphere having oppositely extending eyes for attachment to the elastic line and the standard fishing line. The stop structure associated with the rod is a pin 13 which extends transversely through the rod through holes provided therefor, and which is secured to the rod by cementing or any other suitable means. The pin is dimensioned to pass the line 20 but not the coupler 22. The coupler is dimensioned to pass freely through the rod bore between the butt end and the pin 13 so that it will not bind within the rod.

FIG. 1 illustrates the minimum extension of the fishing line, wherein the elastic line 21 is substantially fully contracted, but is still under tension because the retraction of the line is limited by a stop 28. The stop 28 is an enlargement on the nonelastic fishing line 20, and which engages the tip end of the rod to prevent further withdrawal of the line into the rod interior. This stop 28 could be a knot formed in the line, or could be any other suitable form of enlargement fixed to the line and sufficiently large so as not to pass through the tip end of the rod. The minimum length then of the elastic line 21 may be about 1 foot or less, for example, resulting in the retaining of about 3 ½ feet or more of nonelastic line 20 within the rod interior. The fishing line extension then is about 5 to 5 ½ feet. When a fish takes the bait and runs, the restraint on the line by the elastic will help set the hook.

FIG. 2 illustrates the condition in which an intermediate length of the fishing line extends from the tip end of the rod; and this intermediate length is selected by securing the line to a retaining finger 14, which is defined by a pin secured to the rod at the tip end and projecting slightly beyond the tip end. To fix the length of line, the line is withdrawn from the rod interior, thereby stretching the elastic line, and a loop is formed over the finger as illustrated in FIG. 2. The tension on the line will then lock the loop over the finger and prevent further withdrawal into the rod. This then fixes the length of line which will extend from the rod tip to the hook in accordance with the wishes of the fisherman. When a fish takes the bait and pulls the line away from the tip end, the loop will slip off the finger 14; and the tension on the line provided by the elastic line 21 will act as a restraint to help set the hook. when the fish relaxes or swims back toward the rod, the elastic line will, of course, retract.

FIG. 3 illustrates the maximum extension condition of the fishing line. While this illustrates the coupler 22 against the stop pin 13, it may be preferable to allow some small distance between the coupler and pin to allow the line loop to be pulled off the finger and again provide some elastic restraint to help set the hook.

Figure 4:
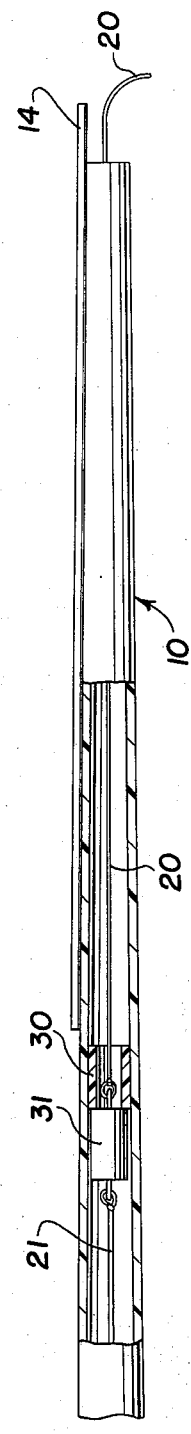
FIG. 4 is a fragmentary sectional view of the tip end of a rod, illustrating an alternative structure for limiting the maximum line extension.

FIG. 4 illustrates an alternative form of rod stop structure and coacting fishing line coupler. Here the stop structure is a short sleeve 30 of any suitable material which is inserted within the rod bore, and fixed to the interior of the rod bore adjacent to the tip end by cementing or other suitable means. This sleeve then represents an annular protuberance into the bore which defines an annular shoulder facing the butt end. The coacting coupler 31 is a cylindrical member having oppositely extending eyes for securing the two portions of the fishing line, and presents a circular end face for engagement with the sleeve shoulder. The cylindrical coupler 31 is dimensioned to pass freely through the rod up to the sleeve 30.

Figure 5:
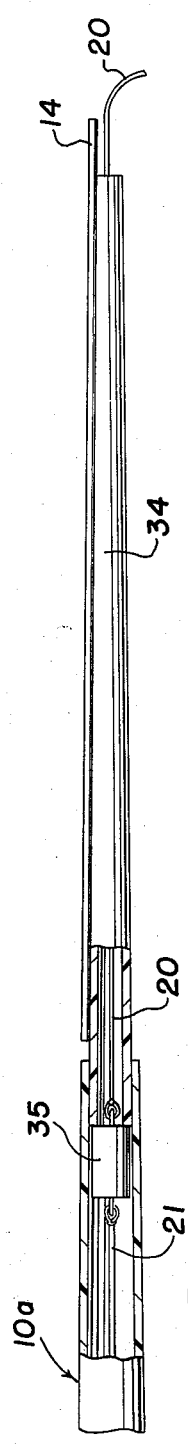
FIG. 5 is a fragmentary sectional view of the tip end of a rod, illustrating still another alternative structure for limiting the maximum line extension.

FIG. 5 illustrates another alternative form of coacting rod stop structure and coupler. Here the tip end of the rod consists of a separate elongated hollow tip member 34 which is telescopically received within the main rod body 10a, and cemented or otherwise secured to the main body. This tip member 34 forms an annular shoulder facing the butt end of the rod. The coupler 35 may be identical to the coupler 31, being a cylindrical member having eyes for securing the line portions and presenting a circular face which abuts the shoulder defined by the tip member 34. Again, this coupler is dimensioned to pass freely through the bore of the rod 10 up to the tip member 34.

FIG. 6 illustrates still another alternative form of coacting rod structure and coupler. Here the pertinent rod structure is the configuration of the bore of the rod, at least adjacent to the tip end, the bore tapering or reducing in diameter as it approaches the tip end. The coupler 41 is a member formed in the configuration of base-to-base cones, with eyes projecting from both apexes for attachment to the respective line portions. This coupler then, has an enlarged annular waist which is of small axial dimension to minimize the binding of the coupler with the rod bore. The coupler waist is dimensioned to engage the bore wall, adjacent to the tip end of the rod, to provide the limit of fishing line extension.

Operation

The operation of the fishing rod assembly will now be described briefly.

Should the fisherman desire the minimum length of line extending from the rod, he will simply fish with the rod in the form illustrated in FIG. 1. When a fish takes the bait and starts to run with the line, the resistance to running will increase as the fish swims away from the rod and extends the elastic line, and the coupler will limit the maximum extension of the line from the rod.

Should the fisherman desire to have a longer length of line extending from the rod tip, he will withdraw a desired amount of line from the tip of the rod, then form the loop and slip the loop over the finger 14 in the manner illustrated in FIG. 2. The tension provided by the elastic line 21 will then lock the loop to prevent the line from being withdrawn back into the rod. The length of fishing line is then fixed, until a fish takes the bait and slips the loop off the finger 14. When a fish takes the bait the tension on the line will help to set the hook. Again the limit of line extension is fixed by the engagement of the coupler with the coacting limit structure (pin 13) of the fishing rod.

For maximum line extension, the fishing line will be withdrawn until the coupler engages or nearly engages the coacting limit structure of the fishing rod; and the loop is again formed in the line 20 for coacting engagement with the finger 14. The loop may be fixed on the finger with the coupler at the extreme limit; in which case the loop will not be withdrawn from the finger when a fish takes the bait; and the line will remain fixed in this maximum extended condition until the loop is manually removed from the finger by the user.

Features and Advantages

A principal feature and advantage of the fishing rod assembly according to the invention is that it provides a complete and very inexpensive fishing rod and line assembly, the assembly having means for some adjustment of the length of the fishing line extending from the tip of the pole as desired by the user. The availability of such an inexpensive fishing rod assembly contributes to the enjoyment of the fishing experience by children and by other novice fishermen.

A feature of the invention is that the provision of the elastic portion of the line helps to set the hook in the fish when a fish takes the bait and attempts to run from the rod.

Still another feature of the invention is that the assembly is very easy to use by children or by novice fishermen, particularly with respect to adjusting the length of the fishing line which extends from the rod tip.

While preferred embodiments of the invention have been illustrated and described, it will be understood by those skilled in the art that any changes and modifications may be resorted to without departing from the spirit and scope of the invention.

What is claimed is:

1. A fishing rod comprising
   an elongated hollow rod having a butt end and a tip end;
   an end plug removably secured to said rod at said butt end, having line attachment means extending into said rod;
   fishing line including an elongated elastic line disposed within said rod and having one end attached to said plug attachment means, and a nonelastic line extending into said rod through said tip end and attached to the other end of said elastic line;
   said rod and fishing line having coacting limit means to limit maximum extension of said fishing line;
   line retaining means fixed to the exterior of said rod at said tip end, for receiving a loop formed in said line to limit withdrawal of line into the rod interior by said elastic line.

2. A fishing rod as set forth in claim 1 stop means fixed to said fishing line and coacting with the tip end of said fishing rod to limit the withdrawal of said fishing line into said rod.

3. A fishing rod as set forth in claim 1
said rod having means defining an internal annular protuberance adjacent to its tip end; and said line including an enlarged plug dimensioned to be restrained by said protuberance as said line is withdrawn from said rod, thereby limiting the maximum extension of said line.

4. A fishing rod as set forth in claim 3
said protuberance comprising a sleeve secured to the interior of said rod.

5. A fishing rod as set forth in claim 1
said limit means comprising a transverse pin secured in said rod adjacent to the tip end thereof permitting passage of said fishing line through said rod, and an enlarged plug fixed to said fishing line dimensioned to pass through said rod and engage said pin to prevent further extension of said line.

6. A fishing rod as set forth in claim 1
said limit means comprising said rod having an internally tapered passage tapering toward its tip end; and plug means secured to said fishing line dimensioned to engage the internally tapered walls adjacent to the tip end to prevent further extension of said line.

* * * * *